US012673668B2

(12) United States Patent
Guan et al.

(10) Patent No.: US 12,673,668 B2
(45) Date of Patent: Jul. 7, 2026

(54) ELECTRONIC VULNERABILITY DETECTION AND MEASURING SYSTEM AND METHOD FOR SUSCEPTIBILITY OR VULNERABILITY OF TRUCK FLEET TO OCCURRING ACCIDENT EVENTS

(71) Applicant: Swiss Reinsurance Company Ltd., Zürich (CH)

(72) Inventors: Jinyan Guan, Zürich (CH); Ting Ting Sun, Zürich (CH); Tao Li, Zürich (CH); Wei Ding, Zürich (CH); Mobing Zhuang, Zürich (CH)

(73) Assignee: Swiss Reinsurance Company Ltd., Zurich (CH)

( * ) Notice: Subject to any disclaimer, the term of this patent is extended or adjusted under 35 U.S.C. 154(b) by 116 days.

(21) Appl. No.: 18/481,020

(22) Filed: Oct. 4, 2023

(65) Prior Publication Data

US 2024/0025397 A1 Jan. 25, 2024

Related U.S. Application Data

(63) Continuation of application No. PCT/EP2023/064974, filed on Jun. 5, 2023.

(30) Foreign Application Priority Data

Jun. 7, 2022 (CH) ............................... 000691/2022

(51) Int. Cl.
*B60W 30/09* (2012.01)
*B60W 50/14* (2020.01)
*G08G 1/00* (2006.01)

(52) U.S. Cl.
CPC ............ *B60W 30/09* (2013.01); *B60W 50/14* (2013.01); *G08G 1/22* (2013.01)

(58) Field of Classification Search
CPC ........ B60W 30/00; B60W 50/00; G08G 1/00; G07C 5/00; G06Q 40/00
See application file for complete search history.

(56) References Cited

U.S. PATENT DOCUMENTS 10,964,130 B1 * 3/2021 Dixit .................. G05B 23/0283
11,441,916 B1 * 9/2022 Konrardy ............. G01C 21/343
(Continued)

FOREIGN PATENT DOCUMENTS

CN 112836917 A 5/2021
CN 113554517 A 10/2021

OTHER PUBLICATIONS

Kracker, "Automatic Analysis of Crash Simulations with Dimensionality Reduction Algorithms such as PCA and t-SNE" , Jun. 2020 (Year: 2020).*
(Continued)

*Primary Examiner* — Aniss Chad
*Assistant Examiner* — Elizabeth J Slowik
(74) *Attorney, Agent, or Firm* — Oblon, McClelland, Maier & Neustadt, L.L.P.

(57) ABSTRACT

An electronic vulnerability detection and measuring system and method for susceptibility or vulnerability measurements of a truck fleet to occurring accident events caused by a carriage vehicle of the carriage vehicle fleet. At least one data interface is associated with a data access device to a carriage vehicle fleet database for capturing carriage vehicle data as a fleet input signals from the carriage vehicle fleet database. The carriage vehicle data includes vehicle data including physical parameter measurements of carriage vehicle characteristics for the carriage vehicles, carriage vehicle driver data including physical parameter measure-
(Continued)

ments of driver characteristics and/or carriage vehicle usage data including physical parameter measurements of carriage vehicle usage characteristics.

15 Claims, 3 Drawing Sheets

(56) References Cited

U.S. PATENT DOCUMENTS

| | | | | |
|---|---|---|---|---|
| 11,704,007 | B2 * | 7/2023 | Adenwala | H04W 4/026 715/733 |
| 2010/0251956 | A1 | 10/2010 | Hilliard | |
| 2017/0021764 | A1 * | 1/2017 | Adams | G06Q 40/08 |
| 2021/0094577 | A1 * | 4/2021 | Shalev-Shwartz | B60W 60/001 |
| 2021/0287530 | A1 * | 9/2021 | Reichardt | G06F 18/251 |
| 2022/0074758 | A1 * | 3/2022 | Sameer | G08G 1/096775 |
| 2022/0297699 | A1 * | 9/2022 | Kim | H04W 4/06 |
| 2022/0366336 | A1 * | 11/2022 | Khasis | G08G 1/04 |
| 2023/0308901 | A1 * | 9/2023 | De Andrade | H04W 24/08 |
| 2023/0343147 | A1 * | 10/2023 | Vasudevan | G06Q 50/40 |

OTHER PUBLICATIONS

Boesch, "Deep Neural Network: The 3 Popular Types (MLP, CNN, and RNN)", Apr. 8, 2021 (Year: 2021).*

Anowar, "Conceptual and empirical comparison of dimensionality reduction algorithms (PCA, KPCA, LDA, MDS, SVD, LLE, ISOMAP, LE, ICA , t-SNE)", 2021, Computer Science Review 40 (Year: 2021).*

* cited by examiner

ELECTRONIC VULNERABILITY DETECTION AND MEASURING SYSTEM AND METHOD FOR SUSCEPTIBILITY OR VULNERABILITY OF TRUCK FLEET TO OCCURRING ACCIDENT EVENTS

CROSS-REFERENCE TO RELATED APPLICATIONS

This application is a continuation of and claims benefit under 35 U.S.C. § 120 to International Application No. PCT/EP2023/064974 filed on Jun. 5, 2023, which is based upon and claims the benefit of priority from Swiss Application No. 000691/2022, filed Jun. 7, 2022, the entire contents of each of which are incorporated herein by reference.

FIELD OF THE INVENTION

The present invention relates to an automated digital system, a digital platform, and a method for allocating and/or predicting a risk score measure for a carriage vehicle fleet with respect to an occurrence of a negative impact event with a measurable impact strength caused by a carriage vehicle of the carriage vehicle fleet. In particular the present invention relates to a digital system and a method for risk score modelling for an assessment of truck fleet's insurance risks and risk-transfer products. More particularly, it relates to a digital system and a method providing risk score measures for underwriting, risk management, risk portfolio evaluation and configuring of insurance products.

BACKGROUND OF THE INVENTION

Truck transportation is a widely used mode of freight transport. Trucks are defined as motor carriage vehicles with at least four wheels, used for the carriage of goods. They are classified in carriage vehicles weighing more than 3.5 tons and heavy carriage vehicles weighing more than 16 tons. The end-use of trucks varies widely. They may for instance be used for long-haul or regional delivery, for construction or for municipality use. Depending on their mission, most trucks are custom-built on an individual basis, often in a multi-stage process, in order to meet specific requirements. They can vary from the number of axles to the size of the engine, fuel tank or cabin, to the height of the chassis. When taking the complete vehicle into account—a rigid body or a tractor plus a trailer—the truck market becomes even more complex. There is a countless number of shapes and sizes of trucks.

Although maritime or railway transportation may be a useful solution for large freight volumes over long distances, truck transportation remains the predominant mode of cargo transportation for short distances and remote areas. Road freight transport is the backbone of trade and commerce in Europe and the US. Trucks carry more than two thirds of freight transported over land. Other transport modes, like inland waterways, shipping, air, and rail transport, also depend on trucks to transfer freight to and from depots, rail terminals, airfields, and ports. Not only do trucks remain the most responsive and economic mode of transport for the vast majority of goods and freight, they are also essential to the functioning of the larger, world-wide logistics and transport systems. Most of our daily necessities, such as fresh food from the supermarket or corner shop, newspapers and magazines, electronics and appliances, clothing, and so on, depend on trucks at some point in the distribution chain. Furthermore, many essential public services are delivered by trucks, such as garbage collection, fire, and construction services. Further, transportation via heavyweight vehicles has a considerable advantage in comparison to other means of transportation: flexibility. Whether it is due to versatility, thanks in particular to the ways in which loading/unloading is carried out, or due to the ability to adapt to roadway conditions (such as weather conditions and traffic), truck transportation satisfies a wide range of transportation needs. This has never been truer, since truck transportation increasingly uses technological benefits and enhancements, which make truck-based logistics even more efficient when transporting cargo.

However, large and heavyweight trucks represent a significant risk for everyone participating in road traffic. Trucks are overrepresented in terms of both fatal crash frequency and serious property damage compared with passenger cars. There is a number of common risk factors that contribute to serious truck crashes.

Safely driving a heavy carriage vehicles requires considerable skill and good judgment that tends to evolve and improve with years of driving experience. Inexperienced truck drivers are a considerable risk factor. For this reason, hiring drivers who have several years of recent truck driving experience is widely considered an industry best practice. It also is important to ensure drivers are familiar with the equipment they are using and the type of cargo they are transporting. Even for experienced drivers, changing jobs can mean operating unfamiliar equipment, driving to unfamiliar locations, handling new types of cargo and being uncertain about job expectations. These changes can cause drivers to be distracted and increase their crash risk. Further, different personalities lead to a driver's predilection for risk-taking or safe driving. For example, multiple moving violations and accidents may indicate that a driver is prone to risk-taking.

Driving too fast for road, weather and traffic conditions is a factor in many serious truck crashes. Pressure to meet delivery deadlines, or a driver's desire to maximize pay through increased mileage or commission, are some of the motivators to speed. Citations for speeding and driving too fast for conditions may reveal a disregard for speed limits and reasonable safety precautions. Driver performance data from onboard safety monitoring devices can help identify vehicles that are being operated unsafely. Rear-end accidents are often associated with poor space management. One way to help reduce the risk of rear-end collisions is to provide training so drivers understand the need to maintain a safe following distance. Monitoring driver performance is also important. Further, distraction, such as using mobile devices to call or text, eating or reading, is a common cause of crashes for all types of vehicles. Next, a lack of sleep can impair a driver's judgment and reaction time. In fact, some fatigue studies suggest that drivers who have been without sleep for 24 hours are as impaired as drivers who are intoxicated. This diminished ability to recognize hazards and react quickly can lead to serious crashes. Also, vehicle characteristics can play a role in crashes. For example, blind spots can contribute to lane-change crashes. A high center of gravity or incorrect freight loading can lead to turn over accidents in curves.

A variety of collision avoidance technologies are available to help drivers avoid accidents, including, for example, electronic stability control, roll stability control, forward collision warning, automatic emergency braking, lane departure warning and more. These technologies succeeded in reducing the frequency and severity of truck accidents, however the costs of damages or loss of vehicles caused by truck accidents is still high. Accordingly the insurance industry has a high demand for accurate risk measurements and risk-transfer analysis.

For example, US 2010251956 A1 discloses a system for providing a risk scoring in regard to so called rollovers of trucks. One of the most common "critical reason" (22.3%) for single-vehicle large truck crashes is "too fast for curve/turn" which leads directly to rollovers and skids. The system, using Manual Inclinometer System(s) (MIS), is able to provide a heads-up visual warning to drivers when their vehicle is going too fast for any (dry) curve or turn, and thereby prompt them to slow down before it is too late. When the relative lateral acceleration of any "too fast for curve/turn" condition exceeds a preset threshold, then the MIS unit can also (optionally) latch-up in order to provide a warning to fleet safety managers and/or law enforcement that a driver is at high risk for having a preventable rollover crash. Drivers posing a high risk for preventable rollover crashes may also pose a high risk for other types of crashes, so identifying these drivers in advance may help to prevent these other types of crashes as well. CN112836917A discloses another system for risk scoring of drivers. The invention provides a risk rating composed of two sets of risk rating modeling. The risk rating system comprises a vehicle waybill risk rating model and a driver driving behavior risk rating model. The risk rating system allows to predict risks on a commercial truck waybill level, where the waybill of the commercial truck refers to a process from goods carrying to goods delivery of the commercial truck, and comprises a whole process from a delivery start point to a delivery end point and during which the commercial truck is parked. The two sets of modeling can be used for commercial truck fleet risk management, and the total risk of commercial trucks is minimized by matching the waybill risk and the driver risk. Further, CN113554517A discloses a system for risk assessment for truck risks and providing appropriate risk-transfer. The method comprises the steps of (1) acquiring truck insurance policy data of each insurance company; based on the truck insurance policy data of the insurance companies, generating risk assessment indexes of the insurance companies, wherein the risk assessment indexes comprise predicted loss ratios, a serious traffic illegal behavior policy proportion, a network access rate, a guarantee coverage degree, a guarantee sufficiency degree and a full policy rate; and (2) according to the risk assessment index of each insurance company, obtaining a risk assessment value of each insurance company and a risk classification supervision level to which each insurance company belongs. According to the method, the real risk management capability and the risk bearing capability of each insurance company in the aspect of truck insurance underwriting can be monitored, and the overall risk management capability and the insurance policy guarantee degree of each insurance company in the truck insurance market can be evaluated.

However, the risk assessment systems according to the state of the art fail to accurately consider driver capabilities and performance, environmental conditions or the influence of truck monitoring or controlling means for assessing a risk score of a truck fleet. Furthermore, such systems cannot reliably quantify future risk scores and take into account future fleet developments and changes.

SUMMARY OF THE INVENTION

It is one object of the present invention to provide an automated digital system and a method for allocating and/or predicting a risk score measure for a carriage vehicle directed, inter alia, to measure a dynamic risk score for carriage vehicle fleets including changing carriage vehicles, which is essentially based on measured carriage vehicle, driver, and usage conditions. The invention shall provide a unified measuring solution considering changes and updates of the carriage vehicle fleet. Further, it is an object of the present invention to provide an automated digital platform that allows for systematic capturing, measuring, quantifying, and forward-looking generating of appropriate risk-transfer measures for fleet developments and capturing physical real-world assets and objects based on physical risk measuring parameter values and data. In particular, it is a technical object of the invention to provide a measuring systems measuring quantifying risk score measures for each of one or more vehicles and forecast measurement-based an incident frequency.

Further, it is an object of the present invention to provide an automated digital system and a method reacting, in real-time, dynamically on captured monitoring measures of motion, environmental or operational parameters of the carriage vehicle fleets during operation, in particular allowing a user to dynamically and in real-time adapt risk-transfer profiles based on monitoring, capturing and reacting on carriage vehicles operation. More particular, it is an object of the present invention to provide a way to technically capture, handle and automate dynamically adaptable, complex, and difficult to compare risk transfer structures by the user, to dynamically synchronize and adjust such structures to changing usage or operational conditions and to predict future risk transfer modalities for a dynamically changing carriage vehicle fleet.

According to the present invention, these objects are achieved, particularly, with the features of the independent claims. In addition, further advantageous embodiments can be derived from the dependent claims and the related descriptions.

According to the present invention, the above-mentioned objects are solved by an automated digital system for allocating and/or predicting a risk score measure for a carriage vehicle fleet with respect to an occurrence of a negative impact event with a measurable impact strength caused by a carriage vehicle of the carriage vehicle fleet. The automated system comprises at least one data interface associated with data access means to a carriage vehicle fleet database for capturing carriage vehicle data as a fleet input signals from the carriage vehicle fleet database, where the carriage vehicle fleet database is fed by transmitted telematics e.g. associated with ADAS devices on vehicle monitoring and storing the telematics signal directly on the carriage vehicle fleet database or via a telematics company database which install ADAS device on vehicle and monitors the signal. It is to be noted that in the first case, the telematics on-vehicle and the data transmission means and interfaces form part of the inventive measuring system. For example, the carriage vehicle fleet database can be provided as a cloud-based database storing carriage vehicle data managed by a logistics provider maintaining the carriage vehicle fleet. The database may be accessed via an application programming interface (API). The carriage vehicle data can e.g. comprise: (1) vehicle data comprising physical parameter measurements of carriage vehicle characteristics for the carriage vehicles of the carriage vehicle fleet, and/or (2) carriage vehicle driver data comprising physical parameter measurements of driver characteristics, and/or (3) carriage vehicle usage data comprising physical parameter measurements of carriage vehicle usage characteristics. For example, the carriage vehicle characteristics are provided by measurements of a vehicle type, a curb weight, a brand or make of the carriage vehicle, etc. The driver characteristics may be provided by measurements of age, gender, driving experience, driving record, etc. The vehicle usage characteristics may be provided by measurements of location range of operation, driving hours per day, mileage per day, rural or urban environment, etc. Optionally, the carriage vehicle data may include insurance data, for example about existing insurance policies and claims. Further, the automated digital system comprises at least one data interface associated with data access means for capturing behavioral driving data detected by an electronic driving monitoring system of at least one carriage vehicle of the carriage vehicle fleet as a driving data input signal. The data access means is connected to the driving monitoring system of the at least one carriage vehicle. For example the data access means is directly connected or is indirectly connected via a driving monitoring database storing the behavioral driving data of the driving monitoring system.

Further, the fleet input signal and the driving data input signal can e.g. be received and/or captured via a data transition interface and stored in a persistent storage is data storage device, where the data are transformed by the processing unit. The machine learning module processes the formatted date and generates the risk score measure. In particular, the automated digital system comprises a processing unit designed for receiving the fleet input signal and the driving data input signal, wherein the processing unit and the machine learning module are realized as separate data processing devices or the processing unit comprises a machine learning module for analyzing the data provided by the fleet input signal and the driving data input signal of at least one carriage vehicle by using one or more machine learning structures and generating a risk index value for the carriage vehicles of the carriage vehicle fleet, and an aggregating module for automatically generating an aggregated risk score measure for the carriage vehicle fleet based on the risk index values of the carriage vehicles. The automated digital system comprises a signal generator providing the aggregated risk score measure as output signal indicating the risk score measure of the carriage vehicle fleet. As an embodiment variant, the output signaling can also be transmitted to a risk-transfer system for providing automated underwriting with appropriately calibrated policy premium values.

The aggregated risk score measure for the carriage vehicle fleet can serve as the basis for risk-transfer evaluations, determining insurance premiums and automated billing management. Thanks to the machine learning module, the automated digital system is able to process insufficient data accuracy and bridge data gaps in the carriage vehicle data and/or the behavioral driving data of the carriage vehicle fleet. Since the risk score measure is measured per vehicle instead of fleet, this has the technical advantage that similarities between different carriage vehicle of the same fleet or differing fleets can be identified and advantageously applied to improve the data information used for generating the risk score measures.

For example, the behavioral driving data captured by the electronic driving monitoring system may include (a) speed, location (longitude, latitude, altitude), and direction from GPS; (b) warnings on driving behaviors, for example: (i) Warnings from an Advanced Driver Assistance System (ADAS) about the activation of the system, a forward collision situation, unsafe following situation, lane departure situation, etc.; (ii) Warnings from a Driver Monitoring System (DMS) about the activation of the system, driver fatigues, phone use, smoking, etc.; (c) Warning details, for example about speed and acceleration of the carriage vehicle. In one example, the behavioral driving parameters may be measures at a frequency of per 30 seconds and warning details may for example be measured at a frequency of 5 times per second, from 5 seconds prior to 5 seconds after each warning.

In an embodiment variant, the automated digital system can e.g. comprise a forward-looking modelling module for automatically generating a predicted risk index value of an expected damage and/or loss (loss measures not only for the vehicle itself but also third party loss measures in case of accidents) and/or replacement costs of at least one carriage vehicle of the carriage vehicle fleet by simulating a physically impacting event on the at least one carriage vehicle based on the risk index values generated by the machine learning module; respectively based on the carriage vehicle data and the behavioral driving data. That means the forward looking modelling structure simulates a potential damage or risk for a carriage vehicle and allows for quantifying costs related to such potential damage or risk. The forward looking modelling module allows for precise risk measurements, i.e. dedicated forward-looking measurements of accident occurrence probabilities based on the specific activated safety measures, and for optimized automated risk-transfer and optimized allocation of monetary resources, i.e. determination of optimal ranges or exact values of resource amounts by means of the automated digital system.

The predicted risk index value can for example be provided to the aggregating module together with the risk index values provided by the machine learning module. The aggregating module can include the predicted risks for the carriage vehicle fleet in the aggregated risk score measure, which for example allows for forward-looking risk-transfer evaluation and implementing risk prevention measures.

In a further embodiment variant, the electronic driving monitoring system can e. g. be designed as an Advanced Driver Assistance System (ADAS), and/or an intelligent driving monitoring system (IDMS), and/or an autonomous driving system (ADS), and/or on-board diagnostics (OBD) system. The ADAS may be any technical system that is designed to increase the safety of driving a vehicle. Particularly, an ADAS may comprise a driver-vehicle interface to improve the drivers ability to react to negative impact events on the road. The IDMS may comprise driver-monitoring devices that track for example a driver's attention and can issue alerts when needed, as a safety feature. The IDMS may be realized as an Internet of Things (IoT) application to evaluate vehicle and driver related driving data, particularly be using a telematics system as further explained below. Preferably, the IDMS is designed to follow a driver and/or a vehicle in real-time to monitor current actions of the driver and the vehicle. The ADS comprises a technical system to replace at least partially the need of human driver actions. For example, the ADS is designed to navigate a vehicle from an origin to a destination while avoiding road hazards and responding to environmental and traffic conditions. The OBD is a technical system for self-diagnostics and reporting of a vehicle, which for example provides real-time data about the condition of various vehicle systems. The ADAS, IDMS, ADS and OBD applications of the electronic driving monitoring system may for example provide behavioral driving data as well as vehicle and environmental diagnostics data via digital communication channels to the processing unit of the automated digital system. In advantageous embodiment variant the electronic driving monitoring system is designed to capture physical parameter measurements of carriage vehicle characteristics, driver characteristics and/or carriage vehicle usage characteristics based on advanced driver assistance functionalities including mean speed, maximum speed, percentiles of speed, fatigue driving hours per specified distance, night driving, rush hour driving, urban driving, rural driving, highway driving, over speed driving, and/or warning signal rate.

In an advantageous embodiment variant of the automated digital system, the electronic driving monitoring system comprises a telematics circuit communicating with mobile telematics devices associated with the carriage vehicle of the carriage vehicle fleet, wherein the telematics devices are designed to capture the behavioral driving data of the carriage vehicles of the carriage vehicle fleet. Herein, the term "telematics" is used to describe carriage vehicle onboard communication applications that communicate with one another via receiver components and other telematics devices. The term 'telematics device' as used herein may generally refer to any appropriate device that is adapted to send, receive, and store information via telecommunication devices. The mobile telematics devices may be adapted to be used with the vehicle and configured to store and/or send data associated with a condition of the vehicle. The mobile telematics devices may be in the form of plug-in or integrated vehicle informatics and telecommunication devices capable of remote communication. The telematics devices may be adapted to interact with the processing unit of the automated digital system to provide data information to the modules of the processing unit. In one example variant of the electronic driving monitoring system the telematics devices and/or components are designed to monitor advanced driver assistance functionalities of the at least one carriage vehicle including autonomous emergency braking, lane departure monitoring, forward collision monitoring, unsafe following monitoring, steering assistance, automatic emergency steering, cross traffic alert, adaptive cruise control, blind spot detection, crosswind stabilization, driver monitoring and/or pedestrian detection/avoidance In a further example variant of the automated digital system, the electronic driving monitoring system is designed to capture carriage vehicle parameter values of speed reduction, impact/final speed, impact position, braking distance, warning inception, ADAS feature inception, maximum braking deceleration, maximum braking time and speed range for brake activation. As such, the telematics devices and/or components may be designed to monitor physical parameters at least include driving behavior, speed pattern, distance traveled, location, speed, idling time, harsh acceleration of braking, and fuel consumption.

In a still further embodiment variant, the automated digital system comprises forward-looking modelling module that is designed to generate a predicted risk index value or a predicted warning rate level based on the measured carriage vehicle characteristics, driver characteristics and/or carriage vehicle usage characteristics. As such, the occurrence frequency and severity of negative impact events can be based on a forward-looking simulation approach that is based on the measured actual telematics data. A forward-looking algorithm of the forward-looking modelling module is for example based on a simulative process for quantifying driver and/or driving variables captured by the electronic driving monitoring system. The forward-looking modelling module for example anticipates a future driving situation that initiate a warning by simulating driving conditions and behavior based on previous driving conditions and behaviors of the same or other carriage vehicles of the same or another carriage vehicle fleet. The forward-looking structure may generate predicted warning rate levels based on historic real-world data of driving conditions and behavior. The data processing of the forward-looking structure can e.g. be based on available data on various loss summary report. It can e.g. contain relevant loss data which includes single versus multiple crash injury, crash type, vehicle used for personal business, total number of crashes, crash occurrence and costs by month, and the presence of company versus non-company passengers to achieve goal number one. The loss variables and loss measurements can e.g. be grouped into the following categories/matrix below.

| Variables | Measurements |
|---|---|
| 1. Single vs. Multiple Injury Accident<br>Single<br>Multiple<br>Undetermined | Classified by percentage of total accidents |
| 2. Crash collision type<br>Backing<br>Rear-end<br>Intersection<br>Intersection/w debris<br>Roll-over<br>Single vs. Multiple vehicles<br>Concrete/Gravel | Classified by percentage of total collisions |
| 3. Vehicle utilized for personal business<br>Yes<br>No<br>Undetermined | Classified by the percentage of total incidences. |
| 4. Crash/Collision cost by month<br>Jan Feb Mar<br>Apr May Jun<br>Jul Aug Sep<br>Oct Nov Dec | Identified cost incurred on loss for each month |
| 5. Crash/Collision cost by month<br>Jan Feb Mar<br>Apr May Jun<br>Jul Aug Sep<br>Oct Nov Dec | Identified month with highest number of crash |
| 6. Company vs. non-company passengers in vehicle?<br>Company<br>Yes<br>No<br>Undetermined<br>Non-company<br>Yes<br>No<br>Undetermined | Classified by percentage of total passenger |
| 7. Total number of crash/collision<br>Identified crashes listed on the incidence report. | Identified crashes listed on the incidence |

The forward-looking algorithm may be based on extrapolation of the real-world data into the future. In an advantageous variant the forward-looking modelling module applies a Markov chain model. The Markov chain model uses a sequence of possible negative impact events in which the probability of each event depends only on a state attained in an immediate previous event. As such, the Markov chain model is based on a memoryless probability distributions. Thus, the forward-looking modelling module allows forecasting of a negative impact event with a measurable impact strength for a carriage vehicle fleet and providing a risk score measure for the fleet without extended data processing needs.

In yet a further embodiment variant, the machine learning module of the automated digital system comprises a deep neural network structure for generating the risk index values for the carriage vehicles of the carriage vehicle fleet. The deep neural network structure comprises at least two hidden layers to store and evaluate how significant the behavioral driving data, the vehicle data, the carriage vehicle data and/or the vehicle usage data is to the risk index value. The at least two hidden layers stores information regarding these input data's importance, and develops associations between the importance of combinations of inputs. The deep neural network structure supports the use of unstructured data and enhance efficiency of the automated digital system.

In one example variant the one or more machine learning structures of the machine learning module can be realized as a supervised or unsupervised machine learning algorithm to analyze the fleet input signal and the driving data input signal, and provide validation for the risk index values for the carriage vehicles of the carriage vehicle fleet, wherein the machine learning module provides validated data for the aggregation module and/or the forward-looking modelling module. In a further example variant the one or more machine learning structures of the machine learning module can be realized as a dimensionality reduction algorithm, which is designed to select and/or extract data variables from the carriage vehicle data, the carriage vehicle driver data, and/or the carriage vehicle usage data to simplify a data volume to be processed by the processing unit.

According to a further aspect of the present invention a digital platform provides a digital channel for automated measurement-driven risk-transfer analysis and hosting an automated digital system as described above. The digital platform comprises a cloud-based infrastructure accessible via a digital network and at least one application programming interface (API) for accessing third party information data about the carriage vehicles of the carriage vehicle fleet from a fleet data processing unit. In one example variant the digital platform is hosting a storage module for storing risk index values, predicted risk index values and/or risk score measures provided by the digital system, a risk-transfer (claims) processing module for applying the aggregated risk score measure to a risk-transfer indicator of the carriage vehicle fleet, and a communication module for communicating with users of the digital system. The digital platform allows fast and simple data access and provides insights of the automated digital system in real-time. Thus, risk assessment, measurements and predictions for carriage vehicle fleets are accurate, updated, and accessible in an efficient manner.

According to a still further aspect of the present invention a method for allocating and/or predicting a risk score measure for a carriage vehicle fleet with respect to an occurrence of a negative impact event with a measurable impact strength caused by a carriage vehicle of the carriage vehicle fleet comprises a risk score measuring process at least comprising the following steps: (1) capturing carriage vehicle data from installed ADAS devices on the vehicles and monitor the signal directly and in real-time and/or capturing carriage vehicle data from the carriage vehicle fleet database, wherein the carriage vehicle data comprises vehicle data comprising physical parameter measurements of carriage vehicle characteristics of the carriage vehicles of the carriage vehicle fleet, carriage vehicle driver data comprising physical parameter measurements of driver characteristics and/or carriage vehicle usage data comprising physical parameter measurements of carriage vehicle usage characteristics, (2) capturing behavioral driving data from the electronic driving monitoring system of at least one carriage vehicle of the carriage vehicle fleet comprising physical parameter measurements of a driving behavior of the carriage vehicle and/or the driver and/or usage conditions and-or environmental conditions, (3) analyzing the data provided by the fleet input signal and the driving data input signal of at least one carriage vehicle using the one or more machine learning structures, (4) generating a risk index value for the carriage vehicles of the carriage vehicle fleet, and automatically generating an aggregated risk score measure for the carriage vehicle fleet based on the risk index values of the carriage vehicles, and (5) providing the aggregated risk score measure as an output signal. The output signaling indicating one or more quantified risk score are applicable to automated generation of precisely calibrated premium values or for identifying and detecting risk patterns of each vehicle so that fleet can interrupt upon thresholding one or more predefined threshold value.

In a variant of the method for allocating and/or predicting a risk score measure the risk score measuring process includes an updating step of automatically requesting fleet input signal data and behavioral driving data for carriage vehicles newly added to a carriage vehicle fleet via an application programming interface providing access to third party information data about the carriage vehicles of the carriage vehicle fleet hosted in a fleet data processing unit. Advantageously, the updating step is conducted daily and the aggregated risk score measure for the carriage vehicle fleet is updated accordingly. The risk score measure can e.g. be updated in real-time, on a daily basis or on any other time interval as e.g. on a monthly basis.

The method according to the invention provides a reliable, measurement-based risk score measure for carriage vehicle fleets that can serve as the basis for risk-transfer management of continuously changing fleet sizes, fleet compositions, fleet usage and driver capabilities. Insurance premiums and premium billing can be automatically updated in real-time. The method is flexible in processing incomplete data sets or the carriage vehicle data and/or the behavioral driving data of the carriage vehicle fleet. The method advantageously applies information from various distributed logistic providers via a common digital platform and optimizes risk measures for carriage vehicle fleets for individual logistics providers maintaining diverse carriage vehicle fleets.

BRIEF DESCRIPTION OF THE DRAWINGS

The present invention will be explained in more detail below relying on examples and with reference to these drawings in which.

DETAILED DESCRIPTION OF THE PREFERRED EMBODIMENTS

Figure 1:
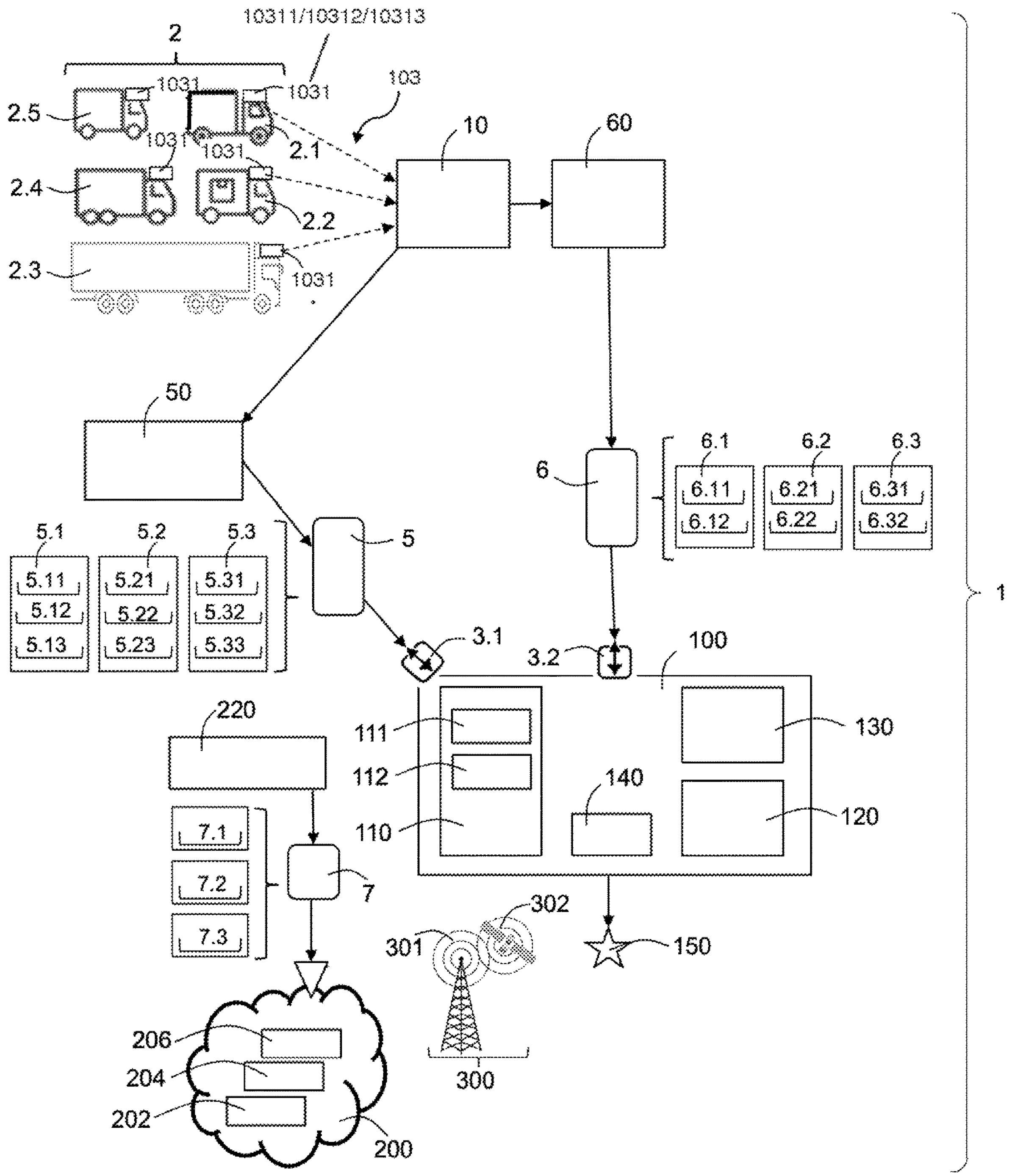
FIG. 1 shows a schematic diagram illustrating the automated digital system for allocating and/or predicting a risk score measure for a carriage vehicle fleet with respect to an occurrence of a negative impact event with a measurable impact strength caused by a carriage vehicle of the carriage vehicle fleet according to the invention.

FIG. 1 schematically illustrates an architecture for a digital platform comprising an automated digital vulnerability detection and measuring system 1 for allocating and/or predicting a risk score measure for a truck or carriage vehicle fleet 2 with respect to an occurrence of a negative impact event with a measurable impact strength caused by a carriage vehicle 2.1, 2.2, 2.3, 2.4 and/or 2.5 of the truck fleet 2. The carriage vehicle fleet represented by the carriage vehicles 2.1, 2.2, 2.3, 2.4 and 2.5 is by example only. In a real world scenario a carriage vehicle fleet may comprise more than just five carriage vehicles. Further, the digital platform comprises a cloud-based infrastructure 200, which can connect to a fleet data processing unit 220 and to the automated digital system 1 via a digital data transmission network 300. The data transmission network 300 for example comprises a cellular mobile network 301 and/or a satellite transmission line 302, for transmitting data between various units and databases of the digital platform.

The automated digital system 1 comprises at least one data interface 3.1 associated with data access means to a carriage vehicle fleet database 50 for capturing carriage vehicle data sets 5.1, 5.2 and 5.3 as a fleet input signals 5 from the carriage vehicle fleet database 50. The system 1 comprises at least one data interface associated with data access means to a carriage vehicle fleet database for capturing carriage vehicle data as a fleet input signals from the carriage vehicle fleet database, where the carriage vehicle fleet database is fed by transmitted telematics e.g. associated with ADAS devices on vehicle monitoring and storing the telematics signal directly on the carriage vehicle fleet database or via a telematics company database which install ADAS device on vehicle and monitors the signal. The raw data can e.g. be pre-processed to produce higher-level variables or "feature vectors", and time-aggregated to yield periodical, e.g. daily or monthly, observation and measurement data that are stored in the database. The objective of any machine-learning model structure is, inter alia, the identification of reliable relationships between certain features of the input data and the target variable or outcome. In the model structures which can e.g. be used herein, the features can include data items such as the parameter values discussed above, etc., and the target output signal can e.g. be the mentioned score measure.

The carriage vehicle data can e.g. comprise: vehicle data comprising physical parameter measurements of carriage vehicle characteristics of the carriage vehicles of the carriage vehicle fleet, carriage vehicle driver data comprising physical parameter measurements of driver characteristics and carriage vehicle usage data comprising physical parameter measurements of carriage vehicle usage characteristics. In the present example, the fleet input signals 5 includes carriage vehicle data set 5.1 of a first carriage vehicle 2.1, carriage vehicle data set 5.2 of a second carriage vehicle 2.2 and carriage vehicle data set 5.3 of a third carriage vehicle 2.3. The carriage vehicle data set 5.1 comprises weight measurement data 5.11 of a weight measurement value indicating a weight of the carriage vehicle 2.1, age measurement data 5.12 of an age measurement value indicating an age of the carriage vehicle driver and daily operating data 5.13 of a measurement value indicating an average time of daily vehicle operation. The carriage vehicle data set 5.2 comprises length measurement data 5.21 of a length measurement value indicating a length of the carriage vehicle 2.2, experience measurement data 5.22 of a driving experience measurement value indicating an overall truck driving mileage of the carriage vehicle driver as an indication of driving experience, and urban exposure data of a measurement value of an average urban exposure percentage of the vehicle usage. The carriage vehicle data set 5.3 comprises engine power measurement data 5.31 of an engine power measurement value indicating an engine power of the carriage vehicle 2.3, gender measurement data 5.32 of a gender measurement value indicating a gender of the carriage vehicle driver and latitude/longitude data 5.33 of a measurement value indicating an average latitude and average longitude of the vehicle usage territory.

Further, the automated digital system 1 comprises at least one data interface 3.2 associated with data access means for capturing behavioral driving data of an electronic driving monitoring system 10 of at least one carriage vehicle of the carriage vehicle fleet 2 as a driving data input signal 6. The electronic driving monitoring system 10 can be realized in-situ of each of the carriage vehicles 2.1, . . . , 2.5 of as centralized unit at the automated digital system 1 accessing the telematics circuits 103 and/or telematics devices 1031 realized at the carriage vehicles 2.1, . . . , 2.5. The data access means can directly be connected to the driving monitoring system 10 of a carriage vehicle, or can be indirectly connected via a driving monitoring database 60 storing the behavioral driving data of the diving monitoring system 10, as indicated in the example of FIG. 1. In the present example, the driving data input signal 6 includes behavioral driving data sets 6.1, 6.2 and 6.3 associated with the carriage vehicles 2.1, 2.2 and 2.3. The behavioral driving data set 6.1 of the carriage vehicle 2.1 comprises unsafe following frequency data 6.11 of a measurement value indicating a number of unsafe following alarms per 100 km and driver attention data 6.12 of a measurement value indicating a driver's eye movement frequency. The behavioral driving data 6.2 of the carriage vehicle 2.2 comprises hazardous side approach data 6.21 of a measurement value indicating a frequency of hazards approaching from a side as the carriage vehicle reverses into moving traffic per 100 km and lane change alarm data 6.22 of a measurement value indicating a frequency of ADAS alarms indicating lane changes in close vicinity of other moving vehicles. The behavioral driving data 6.3 of the carriage vehicle 2.3 comprises over speed data 6.31 of a measurement value indicating a frequency and time period of over speed driving per 100 km and night driving data 6.32 of a measurement value of an average of time periods the carriage vehicle 2.3 is driven in the dark.

The electronic driving monitoring system 10 is designed to capture physical parameter measurements of carriage vehicle characteristics, driver characteristics and/or carriage vehicle usage characteristics based on advanced driver assistance functionalities at least including mean speed, maximum speed, percentiles of speed, fatigue driving hours per specified distance, night driving, rush hour driving, urban driving, rural driving, highway driving, over speed driving, and/or warning signal rate. Thus, the electronic driving monitoring system 10 is used for capturing behavioral driving data, like the data sets 6.1, 6.2 and 6.3, and the system can also capture data for the carriage vehicle data, like the data sets 5.1, 5.2 and 5.3. The physical parameter measurements of the electronic driving monitoring system 10 can be transmitted to the carriage vehicle fleet database 50 and the driving monitoring database 60 by means of telematics via the digital network 300, for example. The electronic driving monitoring system 10 for example comprises an Advanced Driver Assistance System (ADAS), an intelligent driving monitoring system (IDMS), an autonomous driving system (ADS) and/or on-board diagnostics (OBD) system.

The automated digital system 1 further comprises a processing unit 100 designed for receiving the fleet input signal 5 and the driving data input signal 6, wherein the processing unit 100 comprises a machine learning module 110, which is designed for analyzing the data sets 5.1, 5.2, 5.3, 6.1, 6.2 and 6.3 provided by the fleet input signal 5 and the driving data input signal 6 of the carriage vehicles 2.1, 2.2 and 2.3. In the present example, the machine learning module 110 comprises a machine learning structure 111, which for example comprises a supervised/unsupervised machine learning algorithm and a further machine learning structure 112, which for example comprises a dimensionality reduction algorithm. The machine learning module 110 is configured to generate a risk index value for the carriage vehicles of the carriage vehicle fleet. The machine learning module may comprise a deep neural network structure for generating the risk index values for the carriage vehicles of the carriage vehicle fleet. The neural network structure may serve as the basis for the machine learning algorithms and/or process the data generated by the machine learning structures 111 and 112. For example the neural structure may be configured to simulating simulate a physically impacting event based on historical impact data extracted from trajectory images.

The processing unit 100 further comprises a forward-looking modelling module 120 designed for automatically generating a predicted risk index value and an aggregating module 130 designed for automatically generating an aggregated risk score measure for the carriage vehicle fleet based on the risk index values and predicted risk index values of the carriage vehicles 2.1, 2.2 and 2.3. The forward-looking modelling module 120 [for] automatically generates a predicted risk index value for an expected damage and/or expected loss and/or expected replacement costs of at least one carriage vehicle of the carriage vehicle fleet by simulating a physically impacting event on the at least one carriage vehicle based on the risk index values generated by the machine learning module. For example, the simulation is based on historical damage and loss data quantifying negative impacts on carriage vehicles from impact events in the past, which occurred for vehicle with similar carriage vehicle data and behavioral driving data. The simulation may extrapolate from the historical data to the present data of the carriage vehicles to generate a predicted risk index value. The aggregating module is designed for summarizing the risk index values and predicted risk index values of the carriage vehicles of the fleet as an aggregated risk score measure. For example, the aggregating module weighs risk index values for specific carriage vehicles, generates an average fleet risk index and/or provides a risk index matrix illustrating a risk distribution of the carriage vehicle fleet. A signal generator 140 of the processing unit 100 provides the aggregated risk score measure as output signal 150 indicating the risk score measure of the carriage vehicle fleet.

The electronic driving monitoring system 10 of the example automated digital system 1, as shown in FIG. 1, comprises a telematics circuit 103 communicating with mobile telematics devices 1031 associated with the carriage vehicle 2.1, . . . , 2.3 of the truck fleet 2. Further, the electronic driving monitoring system 10 comprises a plurality of sensing device for capturing the carriage vehicle data 5 and the behavioral driving data 6 of the carriage vehicles 2.1, . . . , 2.3 of the truck fleet 2. For example, the sensing devices of the electronic driving monitoring systems of the carriage vehicles 2.1, . . . , 2.3 are part of the Advanced Driver Assistance System (ADAS), the intelligent driving monitoring system (IDMS), the autonomous driving system (ADS) and/or the on-board diagnostics (OBD) system of a carriage vehicle 2.1, . . . , 2.3 to receive data associated with the carriage vehicle 2.1, . . . , 2.3. The telematics circuit 103 may act as a wireless node within the data transmission network 300 by means of antenna connections for providing the wireless connection.

The sensing devices are for example designed to monitor advanced driver assistance functionalities of the carriage vehicles including autonomous emergency braking, lane departure monitoring, forward collision monitoring, unsafe following monitoring, steering assistance, automatic emergency steering, cross traffic alert, adaptive cruise control, blind spot detection, crosswind stabilization, driver monitoring and/or pedestrian detection/avoidance, and to monitor physical parameters at least include driving behavior, speed pattern, distance traveled, location, speed, idling time, harsh acceleration of braking, and fuel consumption.

For example the sensing devices may include proprioceptive sensors for sensing operating parameters of the carriage vehicles and/or exteroceptive sensors for sensing environmental parameters during operation of the carriage vehicles. The exteroceptive sensors or measuring devices may, for example, include long-range radio wave radar devices and short/medium-range radio wave radar devices for monitoring the surrounding of the carriage vehicles and/or the Lidar infrared or laser vision devices for monitoring the surrounding and/or global positioning systems or vehicle tracking devices for measuring positioning parameters of the carriage vehicles and/or odometrical devices for complementing and improving the positioning characteristics values measured by global positioning systems or vehicle tracking devices and/or camera system comprising for example computer vision devices or video cameras for monitoring the surrounding of the carriage vehicles and/or the ultrasonic devices for measuring the position of objects close to the carriage vehicles. Further telematics devices may include a GPS module (Global Positioning System), an odometrical module for complementing and improving the positioning parameters measured by global positioning systems, proprioceptive sensors, vehicle tracking devices and/or computer vision devices and/or geological compass modules based on a 3-axis teslameter and a 3-axis accelerometer, and/or gyrosensor or gyrometer, and/or accelerometer sensors, and/or magneto-resistive permalloy sensors or other three-axis magnetometers. An on-board diagnostic system is a computer system, generally, inside the vehicle that tracks and regulates a vehicle's performance. The scenario detection system 220 may include an on-board diagnostic system and an in-vehicle interactive network system for collecting and communicating data and information from the driving testing system.

The telematics system is designed for collecting and communicating physical parameter measures of the sensing devices as telematics data to the electronic driving monitoring system 10, the driving monitoring database 60 and processing unit 100, respectively. The telematics circuits 103 are associated with the telematics devices for transmitting measured parameter values for the carriage vehicle data 5 and the behavioral driving data 6, and dynamically receive measuring data of the measured values from the telematics devices 1031. The mobile telematics devices 1031 are at least configured to store and/or send measurement data associated with a condition of the vehicle 2.1, . . . , 2.3, the driver and the environment. For example, the mobile telematics devices 103 may be attached to the Advanced Driver Assistance System (ADAS), the intelligent driving monitoring system (IDMS), the autonomous driving system (ADS) and/or the on-board diagnostics (OBD) system of a carriage vehicle. In another example, the mobile telematics devices may be integrated with the carriage vehicle.

The digital platform as illustrated in FIG. 1 provides a digital channel for automated measurement-driven risk-transfer analysis and is designed for hosting the automated digital system 1. The digital platform comprises the cloud-based infrastructure 200, which is accessible via the digital network 300 and at least one application programming interface (API) for accessing third party information data about the carriage vehicles of the carriage vehicle fleet from the fleet data processing unit 220. Additionally, any carriage vehicle fleet database 50 of a logistics provider may be hosted in the cloud-based infrastructure 200 and provide data to the processing unit 100 of the automated digital system 1 or the fleet data processing unit 220 via the digital network 300. The fleet data processing unit 220 may for example provide a third party data signal 7 providing additional information related to the carriage vehicle of the carriage vehicle fleet 2, like existing vehicle risk scores, insurance policy data, geographical data, historical hazard data, etc. The third party data may be retrieved from various data sources, like the SinoiOV database for freight vehicle monitoring, the Shujabao database for technology information, the CatNet database for natural hazard data, any type of insurance contracting databases, etc. For the present example, the third party data signal 7 may provide present risk score data 7.1 for carriage vehicle 2.1, driving violation frequency data 7.2 for the driver of carriage vehicle 2.2 and hazard exposure index data 7.3 for the operating territory of carriage vehicle 2.3. The digital platform 200 is hosting a storage module 202 for example for storing risk index values, predicted risk index values and/or risk score measures provided by the digital system 1, a risk-transfer processing module 204 for applying the aggregated risk score measure to a risk-transfer indicator of the carriage vehicle fleet, and a communication module 206 for communicating with users of the digital system 1. The digital platform may serve as an interface between the automated digital system 1, the various information sources and the logistics providers and insurance carriers involved in the risk-transfer process.

Figure 2:
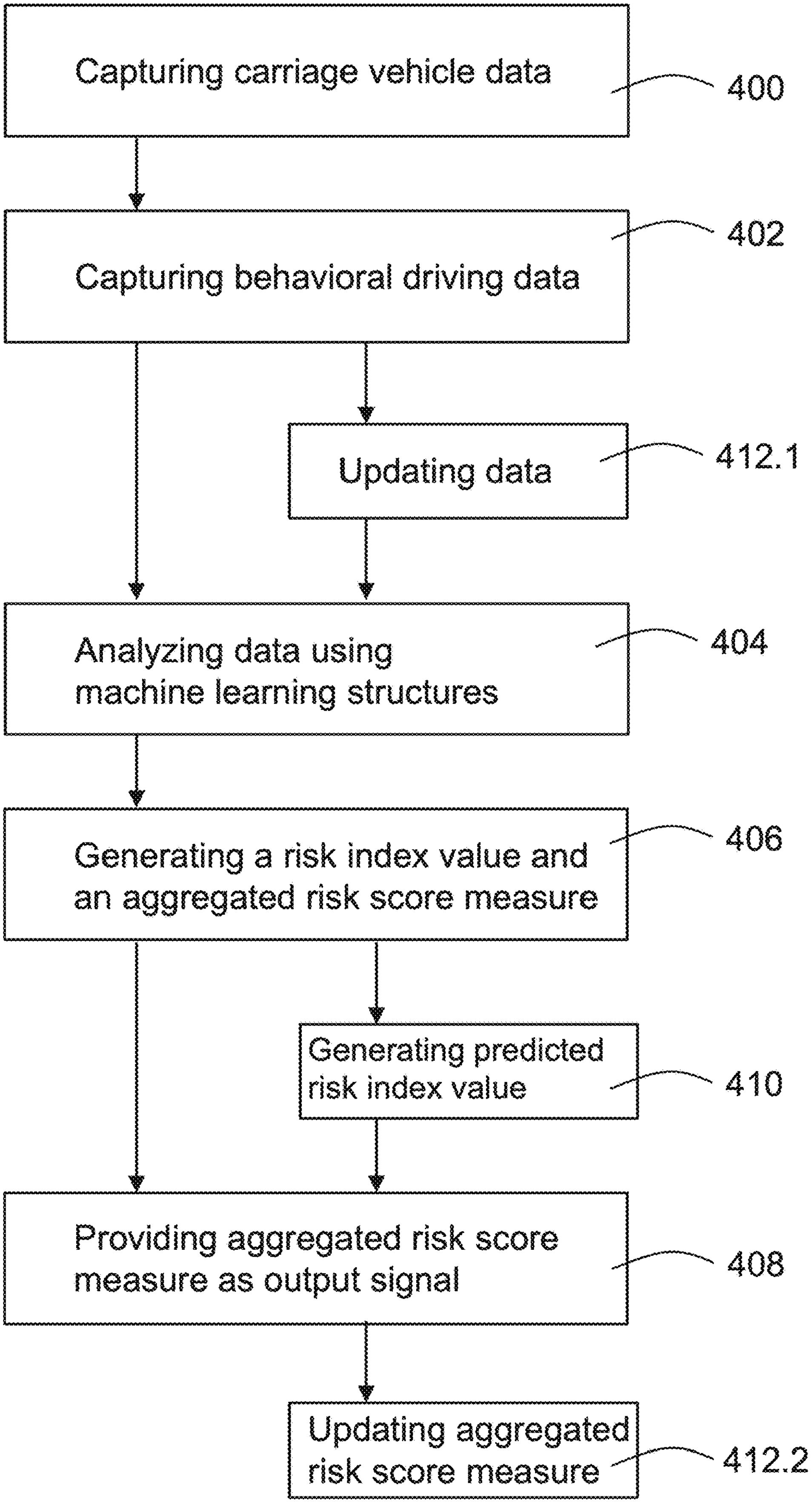
FIG. 2 shows a block diagram schematically illustrating a risk score measuring process of a method for allocating and/or predicting a risk score measure for a carriage vehicle fleet using the automated digital system according to the invention.

FIG. 2 illustrates a flow diagram for a method for allocating and/or predicting a risk score measure for the carriage vehicle fleet 2 with respect to an occurrence of a negative impact event with a measurable impact strength caused by a carriage vehicle 2.1, 2.2, 2.3, 2.4 and 2.5 of the carriage vehicle fleet 2 using the digital system 1. The method applies a risk score measuring process at least comprising the following steps. A carriage vehicle data capturing step 400 capturing data from the carriage vehicle fleet database, for example in form of the fleet input signal 5. The carriage vehicle data comprises: vehicle data comprising physical parameter measurements of carriage vehicle characteristics of the carriage vehicles of the carriage vehicle fleet, carriage vehicle driver data comprising physical parameter measurements of driver characteristics and/or carriage vehicle usage data comprising physical parameter measurements of carriage vehicle usage characteristics. The carriage vehicle data can for example be provided as carriage vehicle data sets like the data sets 5.1, 5.2 and 5.3 of the present example application of the inventive method. Further, the risk score measuring process comprises a behavioral driving data capturing step 402 capturing data from the electronic driving monitoring system 10 of at least one carriage vehicle 2.1, 2.2, 2.3, 2.4 and 2.5 of the carriage vehicle fleet 2 comprising physical parameter measurements of a driving behavior of the carriage vehicle and/or the driver and/or usage or environmental conditions. For example, behavioral driving data capturing step 402 captures the data for example in form of the driving data input signal 6 comprising behavioral driving data sets 6.1, 6.2 and 6.3, like in the present example. Next, the risk score measuring process conducts a data analyzing step 404 for analyzing the data provided by the fleet input signal 5 and the driving data input signal 6 of at least one carriage vehicle using the one or more machine learning structures 111 and 112 and a risk index generating step 406 for generating the risk index value for the carriage vehicles of the carriage vehicle fleet 2. In an aggregating step 408 an aggregated risk score measure for the carriage vehicle fleet 2 is automatically generated based on the risk index values of the carriage vehicles. The aggregated risk score measure is provided as the output signal 150 by the signal generator 140 of the automated digital system 1.

The carriage vehicle data and the behavioral driving data captured in steps 400 and 402 can for example be gathered from the electronic driving monitoring system 10, the driving monitoring database 60, the carriage vehicle fleet database 50, the fleet data processing unit 220 or the storage module 202. The physical parameter measurement values indicated by the carriage vehicle data and the behavioral driving data can be captured by the electronic driving monitoring system 10, particularly the sensing devices thereof as mentioned above.

Optionally, the risk score measuring process comprises a forward-looking modelling step 410 for generating a predicted risk index value and/or a predicted warning rate level based on the measured carriage vehicle characteristics, driver characteristics and/or carriage vehicle usage characteristics using a Markov chain model. The Markov chain modelling allows to predict an ultimate warning rate level that can serve as a quantified risk exposure level for risk-transfer operations.

As mentioned above, the data analyzing step 404 and the risk index generation step 406 can be accomplished by one or more machine learning structures 111 and 112, which apply a supervised or unsupervised machine learning algorithm for analyzing the fleet input signal 5 and the driving data input signal 6. The supervised or unsupervised machine learning algorithm validates the risk index values for the carriage vehicles of the carriage vehicle fleet 2 and provides validated data for the aggregating step 408 and the forward-looking modelling step 410. The supervised or unsupervised machine learning algorithm allows for bridging data gaps and clustering data sets. The risk index generating step 406 and the aggregating step 408 are simplified and therefore accelerated. Further, the data analyzing step 404 and the risk index generation step 406 can be accomplished by on one or more machine learning structures 111 and 112, which apply a dimensionality reduction algorithm selecting and/or extracting data variables from the carriage vehicle data, the carriage vehicle driver data, and/or the carriage vehicle usage data to simplify a data volume to be processed by the risk index generating step 406 and the forward-looking modelling step 410. Again, the risk score measuring process is simplified and the output signal 150 is quickly available.

For increased flexibility and accuracy, the method for allocating and/or predicting a risk score measure for a carriage vehicle fleet 2 the risk score measuring process includes a data updating step 412 automatically requesting fleet input signal data and behavioral driving data for carriage vehicles newly added to the carriage vehicle fleet 2. The updating step 412 is performed for example daily. For example, the automated digital system 1 accesses the fleet data processing unit 220, the carriage vehicle fleet database 50 and/or a third party information data source via an application programming interface. In case a new carriage vehicle has been added to the carriage vehicle fleet or characteristics of an existing carriage vehicle have been changed, the carriage vehicle data sets and the behavioral driving data sets are retrieved and updated, respectively. An update risk index value is generated and the aggregating module 130 generates an updated aggregated risk score measure. Thus, a change of the vehicle stock of a fleet, a change of a driver of a carriage vehicle and/or a change of the usage of a carriage vehicle are taken into account and any risk-transfer processes are based on up to date risk evaluation.

In summary, automated digital system and the method for allocating and/or predicting a risk score measure for a carriage vehicle fleet provides an automated, all-in-one fleet platform providing (i) a TMX data collection for translation Memory eXchang), a digital fleet platform structure and framework, an automated risk-transfer bill management, a risk-transfer underwriting requirement setting and adaption, an integration of third party data, for example as data from on-board ADAS-data (Advanced Driver Assistance System), intelligent driving monitoring systems (IDMS), autonomous driving systems (ADS), and/or on-board diagnostic (OBD) data, and an information management system for carriage vehicle fleets. The system and the platform are automated allowing easy scaling to increasing fleet size. Advantageously, the system and the platform maintain a deal whitelist to record compiled deals to call third party APIs, to schedule a job to automatically call third party API daily, where the job scans through all vehicles to identify newly added vehicles, preferably only calling APIs for newly added vehicles.

Figure 3:
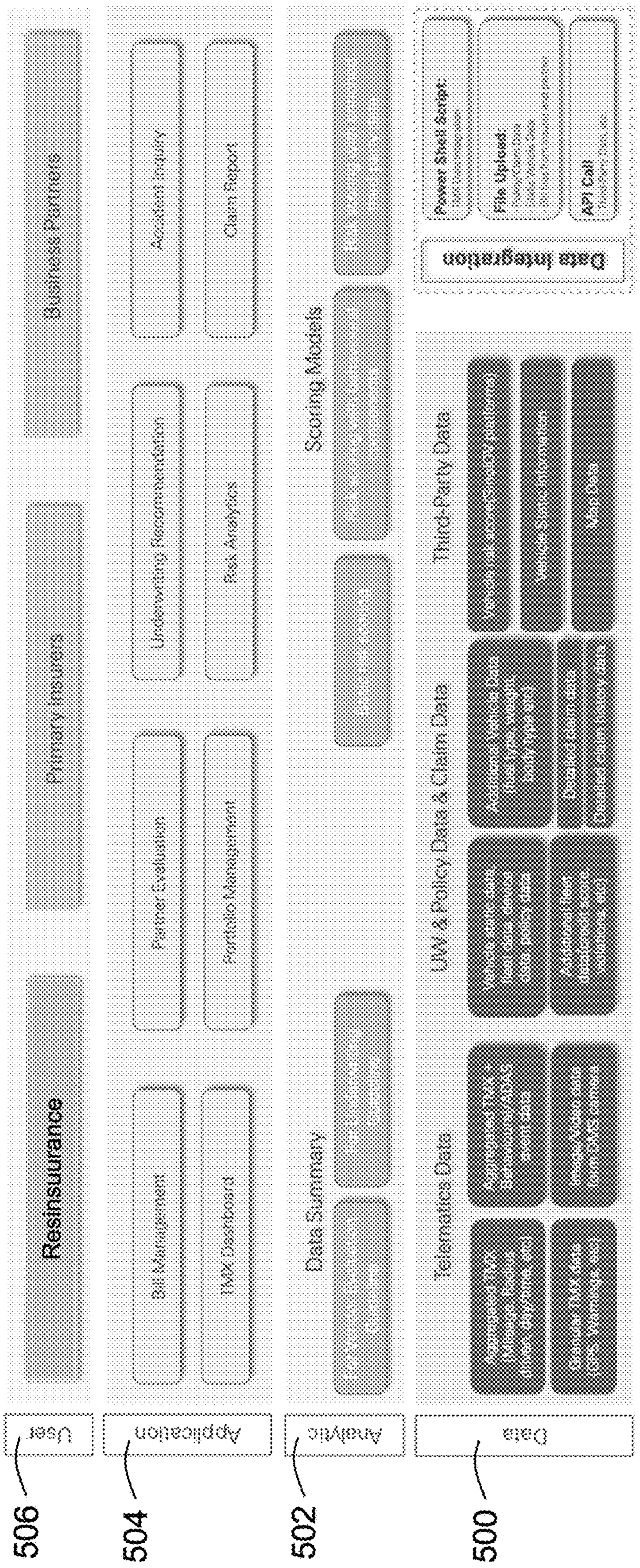
FIG. 3 shows a schematic diagram illustrating a digital platform providing a digital channel for automated measurement-driven risk-transfer analysis and hosting an automated digital system according to the invention.

FIG. 3 summarizes the various modules and applications of the digital platform providing a digital channel for automated measurement-driven risk-transfer analysis. At a data level 500, the carriage vehicle data 5, the behavioral driving data 6 and additional third party data are gathered, such as aggregated and granular translation memory exchange (TMX) data, ADAS data, carriage vehicle static data, policy data, credit score data, violation date, detailed claim and claim history data, map data, etc. The data may be cleaned up by the automated digital system 1, particularly the machine learning module 110 and the neural network, and updated be regularly requesting data updates in the data updating step 412. In an analytics level 502, the risk index values, predicted vulnerability index measure, i.e. the risk index values, and the aggregated vulnerability score measures, i.e. the aggregated risk score measure are generated and can be provided as data summaries and as basis for vendor evaluation guidelines and risk-transfer underwriting guidelines. In an application level 504, the output signal 150 of the automated digital system 1 serves as basis for various applications related to underwriting, risk management, risk portfolio evaluation and configuration of insurance products, like bill management, partner evaluation underwriting recommendation, accident inquiry, claim reporting, portfolio management, etc. In a user level 506, users of the platform receive access to the platform and its applications for exchanging information, data, business requestions, etc.

LIST OF REFERENCES

- 1 Vulnerability detection and measuring system
- 2 Truck fleet
  - 2.1 carriage vehicle
  - 2.2 carriage vehicle
  - 2.3 carriage vehicle
- 3.1 data interface
- 3.2 data interface
- 5 fleet input signal
  - 5.1 carriage vehicle data set
    - 5.11 weight measurement data
    - 5.12 age measurement data
    - 5.13 daily operating data
  - 5.2 carriage vehicle data set
    - 5.21 length measurement data
    - 5.22 experience measurement data
    - 5.23 urban exposure data
  - 5.3 carriage vehicle data set
    - 5.31 power measurement data
    - 5.32 gender measurement data
    - 5.33 latitude/longitude measurement data
  - 50 truck fleet database
- 6 driving data input signal
  - 6.1 behavioral driving data set
    - 6.11 unsafe following frequency data
    - 6.12 driver attention data
  - 6.2 behavioral driving data set
    - 6.21 hazardous side approach data
    - 6.22 lane change alarm data
  - 6.3 behavioral driving data set
    - 6.31 over speed data
    - 6.32 night driving data
- 60 driving monitoring database
- 7 third party data signal
  - 7.1 present risk score data
  - 7.2 driving violation frequency data
  - 7.3 hazard exposure index data
- 10 Electronic driving monitoring system
  - 101 Cloud-interface to telematics system/telematics devices
  - 102 Repository storage/database
  - 103 Telematics circuit or system
    - 1031 Telematics devices
      - 10311 Sensory and measuring devices
        - 103111 GPS sensor
        - 103112 Advanced Driver Assistance System (ADAS)
        - 103113 Intelligent driving monitoring system (IDMS)
        - 103114 Autonomous driving system (ADS)
        - 103115 On-board diagnostics (OBD) system
      - 10312 Multi-band cellular connection via 2G and 3G to 4G or 5G or LTE-M
      - 10313 Integrated e-SIM/SIM
    - 1032 Permanent storage/Firmware storage
    - 1033 Bluetooth low energy connection
    - 1034 Vehicle location tracking module
    - 1035 Emergency warning system
    - 1036 Integrated hands-free cell phones
    - 1037 Wireless safety communications
    - 1038 Automatic driving assistance systems
    - 1039 Wireless Access for the Vehicular Environment (WAVE)
- 100 Processing unit
  - 110 Machine learning module
    - 111 Machine learning structure
    - 112 Machine learning structure
  - 120 Forward-looking modelling module
  - 130 Aggregating module
  - 140 Signal generator
  - 150 Output signal

200 Cloud-based infrastructure
202 Storage module
204 Risk transfer processing module
206 Communication module
220 Fleet data processing unit
300 Digital network
301 Cellular mobile network
302 Satellite transmission network
400 Carriage vehicle data capturing step
402 Behavioral driving data capturing step
404 Data analysis step
406 Vulnerability index generating step
408 Aggregating step
410 Forward-looking modelling step
412.1 Data updating step
412.2 Data updating step
500 Data level
502 Analytics level
504 Application level
506 User level

The invention claimed is:

1. A method for detecting a susceptibility or vulnerability to damage impacts caused by occurring accident events with a measurable impact strength for a carriage vehicle fleet comprising a plurality of carriage vehicles, the method comprising:

capturing, via a telematics circuit that communicates with mobile telematics devices associated with the carriage vehicles, behavioral driving data of the carriage vehicles of the carriage vehicle fleet, the mobile telematics devices comprising sensory and measuring devices at least including a GPS sensor for measuring speed and/or location parameter values at a predefined measuring frequency per time unit;

capturing, via a first data interface, the behavioral driving data of the plurality of carriage vehicle of the carriage vehicle fleet as a driving data input signal;

capturing, via a first data interface, from a carriage vehicle fleet database carriage vehicle data as a fleet input signal from the carriage vehicle fleet database, the carriage vehicle data comprising: vehicle data including physical parameter measurements of carriage vehicle characteristics for the carriage vehicles of the carriage vehicle fleet, carriage vehicle driver data including physical parameter measurements of driver characteristics, and/or carriage vehicle usage data including physical parameter measurements of carriage vehicle usage characteristics;

transmitting the fleet input signal and the driving data input signal to processing circuitry;

analyzing, by a machine learning module of the processing circuitry, the data provided by the fleet input signal and the driving data input signal of at least one carriage vehicle of the carriage vehicles by using one or more machine learning structures;

generating, by the machine learning module, a vulnerability index measure for each of the carriage vehicles of the carriage vehicle fleet, the one of the one or more machine learning structures of the machine learning module being configured to provide dimensionality reduction by selecting and extracting data variables from the carriage vehicle data, the carriage vehicle driver data, and the carriage vehicle usage data;

automatically generating, by an aggregating module of the processing circuitry, an aggregated vulnerability score measure for the carriage vehicle fleet based on the vulnerability index measures of the carriage vehicles;

automatically generating, by a forward-looking modelling module of the processing circuitry, a predicted vulnerability index measure of a predicted damage of at least one carriage vehicle of the carriage vehicle fleet by simulating a physically impacting event on the at least one carriage vehicle based on the vulnerability index measures generated by the machine learning module, the one or more machine learning structures of the machine learning module being realized as an unsupervised machine learning structure analyzing the fleet input signal and the driving data input signal, and providing validation for risk index values for the carriage vehicles of the carriage vehicle fleet, wherein the machine learning module provides validated data for the forward-looking modelling module; and generating, by a signal generator, the aggregated vulnerability score measure as an output signal indicating a vulnerability score measure of the carriage vehicle fleet.

2. The method according to claim 1, further comprising automatically requesting fleet input signal data and behavioral driving data for carriage vehicles added to the carriage vehicle fleet via an application programming interface providing access to third party information data about the carriage vehicles of the carriage vehicle fleet hosted in a fleet data processing device.

3. The method according toe claim 2, wherein the automatic requesting is conducted daily, and the aggregated vulnerability score measure for the carriage vehicle fleet is updated accordingly.

4. An electronic vulnerability detection and measuring system for detecting a susceptibility or vulnerability to damage impacts caused by occurring accident events with a measurable impact strength for a carriage vehicle fleet comprising a plurality of carriage vehicles, the system comprising:

an electronic driving monitoring system with a telematics circuit communicating with mobile telematics devices associated with the carriage vehicles of the carriage vehicle fleet, the mobile telematics devices at least capturing behavioral driving data of the carriage vehicles of the carriage vehicle fleet, and the mobile telematics devices comprising sensory and measuring devices at least including a GPS sensor for measuring speed and/or location parameter values at a predefined measuring frequency per time unit;

a first data interface associated with a first data access device configured to capture the behavioral driving data of the plurality of carriage vehicle of the carriage vehicle fleet as a driving data input signal, the first data access device being connected to the telematics circuit or at least one of the carriage vehicles;

a second data interface associated with a second data access device to a carriage vehicle fleet database for capturing carriage vehicle data as a fleet input signal from the carriage vehicle fleet database, the carriage vehicle data comprising: vehicle data including physical parameter measurements of carriage vehicle characteristics for the carriage vehicles of the carriage vehicle fleet, carriage vehicle driver data including physical parameter measurements of driver characteristics, and/or carriage vehicle usage data including physical parameter measurements of carriage vehicle usage characteristics;

processing circuitry configured to receive the fleet input signal and the driving data input signal, the processing circuitry implementing:

a machine learning module configured to analyze the data provided by the fleet input signal and the driving data input signal of at least one carriage vehicle of the carriage vehicles by using one or more machine learning structures and generating a vulnerability index measure for each of the carriage vehicles of the carriage vehicle fleet, the one of the one or more machine learning structures of the machine learning module being configured to provide dimensionality reduction by selecting and extracting data variables from the carriage vehicle data, the carriage vehicle driver data, and the carriage vehicle usage data, an aggregating module configured to automatically generate an aggregated vulnerability score measure for the carriage vehicle fleet based on the vulnerability index measures of the carriage vehicles, and a forward-looking modelling module configured to automatically generate a predicted vulnerability index measure of a predicted damage of at least one carriage vehicle of the carriage vehicle fleet by simulating a physically impacting event on the at least one carriage vehicle based on the vulnerability index measures generated by the machine learning module, the one or more machine learning structures of the machine learning module being realized as an unsupervised machine learning structure analyzing the fleet input signal and the driving data input signal, and providing validation for risk index values for the carriage vehicles of the carriage vehicle fleet, wherein the machine learning module provides validated data for the forward-looking modelling module; and a signal generator configured to provide the aggregated vulnerability score measure as an output signal indicating a vulnerability score measure of the carriage vehicle fleet.

5. The system according to claim 4, wherein the predefined measuring frequency per time unit is 30 per seconds.

6. The system according to claim 4, wherein the vulnerability index measure is generated as a forecasted probability value for an occurrence of an accident event at a risk measure range between 0 and 1.

7. The system according to claim 4, wherein the electronic driving monitoring system is designed as an Advanced Driver Assistance System (ADAS), an intelligent driving monitoring system (IDMS), an autonomous driving system (ADS), and/or on-board diagnostics (OBD) system.

8. The system according to claim 4, wherein the electronic driving monitoring system is designed to capture physical parameter measurements of the carriage vehicle characteristics, driver characteristics, and/or carriage vehicle usage characteristics based on advanced driver assistance functionalities including mean speed, maximum speed, percentiles of speed, fatigue driving hours per specified distance, night driving, rush hour driving, urban driving, rural driving, highway driving, over speed driving, and/or warning signal rate.

9. The system according to claim 8, wherein the sensory and measuring devices are configured to monitor advanced driver assistance functionalities of the at least one carriage vehicle of the carriage vehicles including autonomous emergency braking, lane departure monitoring, forward collision monitoring, unsafe following monitoring, steering assistance, automatic emergency steering, cross traffic alert, adaptive cruise control, blind spot detection, crosswind stabilization, driver monitoring, and/or pedestrian detection/avoidance.

10. The system according to claim 4, wherein the electronic driving monitoring system includes interfaces capturing carriage vehicle parameter values of speed reduction, impact/final speed, impact position, braking distance, warning inception, ADAS feature inception, maximum braking deceleration, maximum braking time, and speed range for brake activation.

11. The system according to claim 4, wherein the forward-looking modelling module is configured to generate a predicted risk index value and/or a predicted warning rate level based on the physical parameter measurements of the carriage vehicle characteristics, the driver characteristics, and/or the carriage vehicle usage characteristics using a Markov chain model.

12. The system according to claim 11, wherein the machine learning module comprises a deep neural network structure configured to generate the risk index values for the carriage vehicles of the carriage vehicle fleet.

13. The system according to claim 4, wherein the carriage vehicle data, and/or the carriage vehicle driver data, and/or the carriage vehicle usage data at least comprise (i) speed and location measured by the GPS sensor at a frequency of 30 per seconds, (ii) warning alerts on driving behaviors comprising warnings from an Advanced Driver Assistance System (ADAS) at least on forward collision and/or unsafe following and/or lane departure, and/or warning alerts from a Driver Monitoring System (DMS) at least on fatigue measures, phone use measures and/or smoking, (iii) warning detail data at least comprising speed and acceleration at a frequency of 5 times per second, from 5 seconds prior to 5 seconds after each warning, and (iv) risk-transfer data.

14. A digital platform providing a digital channel for automated measurement-driven risk-transfer analysis and hosting the system according to claim 4, wherein the digital platform comprises a cloud-based infrastructure accessible via a digital network and at least one application programming interface for accessing third party information data about the carriage vehicles of the carriage vehicle fleet from a fleet data processing unit device.

15. The digital platform according to claim 14, wherein the platform is configured to host:

a memory configured to store risk index values, predicted risk index values, and/or risk score measures provided by the system, a risk-transfer processing module, implemented by the processing circuitry, configured to apply the aggregated vulnerability score measure to a risk-transfer indicator of the carriage vehicle fleet, and a communication module, implemented by the processing circuitry, configured to communicate with users of the system.

* * * * *